A. E. WHITTIER

THERMOSTATIC CONTROL FOR ELECTRICALLY HEATED APPARATUS

July 30, 1929. Re. 17,391

Original Filed Dec. 9, 1927

INVENTOR

Albert E. Whittier by

Harry R. Williams atty.

Reissued July 30, 1929. Re. 17,391

UNITED STATES PATENT OFFICE.

ALBERT E. WHITTIER, OF BRISTOL, CONNECTICUT.

THERMOSTATIC CONTROL FOR ELECTRICALLY-HEATED APPARATUS.

Original No. 1,713,578, dated May 21, 1929, Serial No. 238,760, filed December 9, 1927. Application for reissue filed June 3, 1929. Serial No. 368,207.

This invention relates to those indicating thermostatic devices which are provided for controlling the current in the circuits of electrically heated apparatus, such for instance as electrically heated ranges and ovens, and more particularly controls that are designed to be fastened to the side walls rather than the front walls or doors of electrically heated ranges and ovens.

The object of the invention is to provide an inexpensive thermostat of the class mentioned that is simple to install and which is readily adjusted so that it will control the temperature of the apparatus to which it is applied very closely between the desired maximum and minimum degrees of heat for which it is rated, the temperatures being visually indicated, and the current conductors being so disposed within the device that they always insure the proper current paths without danger of short circuiting and allow the terminals of the circuit wires to be easily attached without disturbing the mechanism and in such manner that they will not interfere with the adjustment of the current switching means or become disengaged or broken by the movements of the current switching means.

Figure 1:
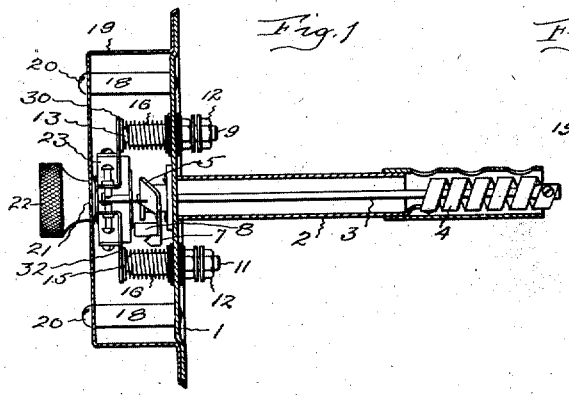
Figure 2:
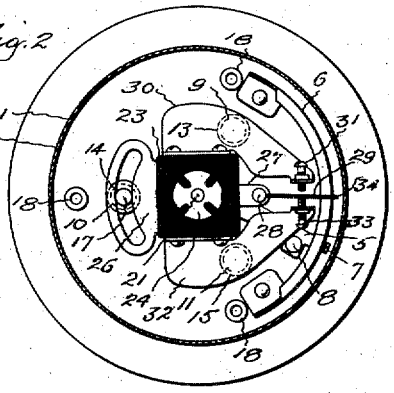
Figure 4:
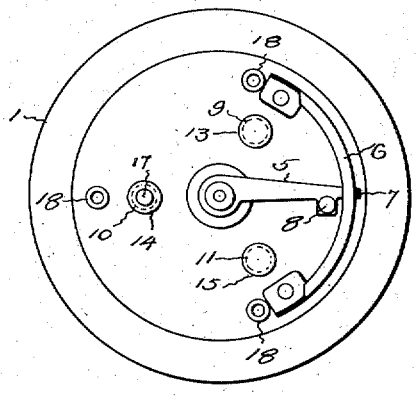
Figure 3:
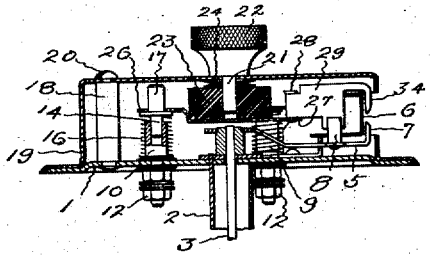
Figure 5:
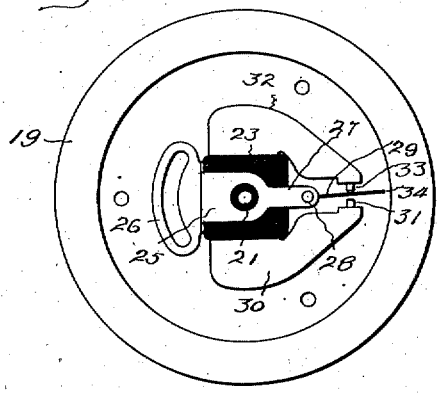
Figure 6:
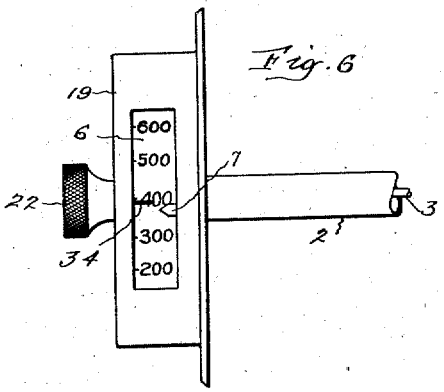

In the accompanying drawings which illustrate an embodiment of the invention, Fig. 1 shows a side elevation of the mechanism with the casing, which comprises a base plate with a tubular stem and a cover, cut in central section. Fig. 2 shows an elevation of the device with the front of the cover cut away. Fig. 3 shows a diametrical section of the parts illustrated in Fig. 2. Fig. 4 is a view looking at the outside of the base plate. Fig. 5 is a view looking into the cover. Fig. 6 is a side view of the device with the parts assembled.

The base plate 1 which is circular is adapted to be fastened to the side wall of the range, oven or other apparatus to which the device is to be applied. Extending centrally from the back of the plate is a tubular stem 2 that is designed to extend through the wall into the interior of the apparatus, the heat of which is to be controlled. Rotarily supported by the plate and extending through the stem is a spindle 3 and encircling the inner end of the spindle with an end fastened thereto and an end fastened to the stem is a coiled strip 4 of thermostatic metal. An arm 5 is fastened to the outer end of the spindle so as to extend radially in front of the plate. A segmental plate 6 graduated with the degrees of heat for which the device is rated is fastened edgewise to the front of the plate. The arc of this graduated plate is concentric with the spindle and the outer end of the arm 5 is bent forward to provide a pointer 7 which will travel over the graduations. The arm 5 carries inside of the graduated plate a forwardly extending stud 8 of insulating material. The pointer 7 is caused to travel over the segmental graduated plate by the oscillations of the arm as the spindle is rotated by the action of the thermostatic coil due to variations of the heat to which it is subjected in the apparatus to which the device is applied.

Fastened to the base plate but insulated therefrom are binding posts 9, 10 and 11. On the back of the plate these posts are threaded and provided with nuts 12 for the attachment of the terminals of the circuit wires, which may lead from any common type of relay operated heating circuit switch. On the front of the plate these posts are tubular and movable in the openings are headed contact studs 13, 14, 15, normally pressed forward by springs 16. The stud 14 has a projecting pin 17 which, as hereinafter described, is employed as a stop to limit the adjusting movements of the circuit switching means and eliminate the possibility of a short circuit.

Posts 18 are fixed to the front of the base plate and a cover 19 is fastened over the base plate by screws 20 which turn into these posts. Rotatable in the center of the cover is a spindle or arbor 21 on the outer end of which is a knob 22 by means of which the arbor may be turned. An insulating block 23 is fixed on the inner end of this arbor so as to turn therewith when the knob is turned. Spring washers 24 are arranged between this block and the inside of the cover so that while the block is free to turn there will be no looseness. Fastened to one face of this insulating block is a conducting plate 25 that has a slotted wing 26 at one end and an extension 27 at the other end. A stud 28 is attached to this extension and loosely pivoted on this stud is a switching blade 29. Fastened to one side of the insulating block is a conducting wing 30 that at one end has a contact screw 31. Fastened to the other side of the block is a conducting wing 32 bearing a contact screw 33. The thin switching blade 29 that is electrically connected with the wing 26 extends between the two contact screws 31 and 33 carried by the wings 30 and 32. The front end of the switching blade is extended over the outer face of the graduated segmental plate and provides an indicating pointer 34.

When the cover is applied to the base plate the conducting wing 30 is engaged by the yielding contact stud 13, and the conducting wing 32 is engaged by the yielding contact stud 15, while the wing 26 which has a slot through which the pin 17 extends, is yieldingly engaged by the head of the contact 14.

With the device in position of use the knob is turned to adjust the pointer 34 at the end of the switch blade 29, carried by the insulating block, to the degree of heat marked on the dial plate which it is desired to maintain. To whatever point the adjustment is made the wings carried by the block are always engaged by the contacts on the base plate. When the main switch of the circuit is closed and the current heats the range, oven or other apparatus, as the heat increases its action on the thermostatic coil turns the arm 5 upward until the insulating stud 8 which the arm carries engages the switching blade and lifts it from contact with the lower screw 39, with which it is always normally in contact, into engagement with the upper screw 31 and this, through the mechanism usually employed and well known, causes the current to be cut off. As the temperature drops, owing to the interruption of the current flow, the thermostatic coil turns the arm down and allows the switching blade to drop back into contact with the lower screw and again cause the current to be turned on. By this means the current is turned on and off and as there are no spring tensions to be overcome, the thermostatic arm only being required to lift the light switching blade, the device is very efficient and the temperature of the range, oven or other apparatus, is maintained very closely to the desired degree. The temperature rises to the degree indicated by the pointer 34 at the end of a switching blade wherever that pointer is set, and remains at practically that degree as long as the heating current is on, and the degree of heat at any moment is indicated by the pointer 7 at the end of the arm that is actuated by the thermostatic coil. The pin 17 on the contact 14 engages the ends of the slot in the wing 26 and prevents the parts from being turned so far as to cause a short circuit.

The device is readily applied to the side wall of electrically heated apparatus so that the temperature conditions at all times may be clearly seen, and the circuit contacts are made so as to be positive and without danger of disruption.

The invention claimed is:—

1. A thermostatic control for electric circuits comprising a base plate, a curved index plate, fixed to the base plate, means for the attachment of circuit wires and yielding contacts electrically connected therewith, fixed to the base plate, a spindle rotatably supported by the base plate, a thermostatic coil with one end connected with the spindle and the other end fixed with relation to the base plate, an arm fixed to the spindle, a cover adapted to be fastened to the base plate, an arbor rotatably supported by the cover, means for rotating the arbor, three conductors rotatable with the arbor and engaged by the stationary contacts on the base, and a switching blade pivotally carried by one of said conductors and extending between the other conductors and into the path of a part of the arm that is actuated by the thermostatic coil, whereby the switching blade may be adjusted to the desired degree of heat and the arm will engage the blade and move it from engagement with one conductor into engagement with the other conductor.

2. A thermostatic control for electric circuits comprising a base plate, a curved index plate fixed to the base plate, means for the attachment of circuit wires and yielding contacts electrically connected therewith, fixed to the base plate, a tubular stem extending from the base plate, a spindle rotatably supported by the base plate and extending into said stem, a thermostatic coil with one end connected with the spindle and the other end connected with the stem, an arm fixed to the spindle and carrying a stud, a cover adapted to be fastened to the base plate, an arbor rotatably supported by the cover, means for rotating the arbor, three conductors rotatable with the arbor and engaged by the stationary contacts on the base, and a switching blade pivotally carried by one of said conductors and extending between the other conductors and into the path of the stud on the arm that is actuated by the thermostatic coil, whereby the switching blade may be adjusted to the desired degree of heat and the stud on the arm will engage the blade and move it from engagement with one conductor into engagement with the other conductor.

3. A thermostatic control for electric circuits comprising a base plate, a curved index plate fixed to the base plate, means for the attachment of circuit wires and yielding contacts electrically connected therewith, fixed to the base plate, a tubular stem extending from the base plate, a spindle rotatably supported by the base plate and extending into said stem, a thermostatic coil with one end connected with the spindle and the other end connected with the stem, an arm fixed to the spindle and carrying an insulated stud, a cover adapted to be fastened to the base plate, an arbor rotatably supported by the cover, means for rotating the arbor, an insulating block fixed to the arbor, three conducors attached to said block and engaged by the stationary contacts on the base, contact screws carried by two of said conductors, and a switching blade carried by the other of said conductors and extending between said screws and into the path of the stud on the arm that is actuated by the thermostatic coil, whereby the switching blade may be adjusted to the desired degree of heat and the stud on the arm will engage the blade and move it from engagement with one contact screw into engagement with the other contact screw.

4. A thermostatic control for electric circuits comprising a base plate, a curved index plate fixed to the base plate, means for the attachment of circuit wires and yielding contacts electrically connected therewith, fixed to the base plate, a tubular stem extending from the base plate, a spindle rotatably supported by the base plate and extending into said stem, a thermostatic coil with one end connected with the spindle and the other end connected with the stem, an arm fixed to the spindle and extending in front of the index plate, a cover adapted to be fastened to the base plate, an arbor rotatably supported by the cover, means for rotating the arbor, an insulating block fixed to the arbor, three conductors attached to said block and engaged by the stationary contacts on the base, and a switching blade pivotally carried by one of said conductors and extending between the other of said conductors into the path of a part of the arm that is actuated by the thermostatic coil and also in front of the index plate, whereby the switching blade may be adjusted to the desired degree of heat and the arm will engage the blade and move it from engagement with one conductor into engagement with the other conductor.

5. A thermostatic control for electric circuits comprising a base plate, a curved index plate fixed to the base plate, means for the attachment of circuit wires and yielding contacts electrically connected therewith, fixed to the base plate, a spindle rotatably supported by the base plate, a thermostatic coil with one end connected with the spindle and the other end fixed with relation to the base plate, an arm fixed to the spindle, a cover, three conductors rotatably supported by the cover and engaged by the stationary contacts on the base, a switching blade pivotally carried by one of said conductors and extending between the other conductors and into the path of a part of the arm that is actuated by the thermostatic coil, and means for rotating said conductors and switching blade.

6. A thermostatic control for electric circuits comprising a base plate, a curved index plate fixed to the base plate, means for the attachment of circuit wires and yielding contacts electrically connected therewith, fixed to the base plate, a tubular stem extending from the base plate, a spindle rotatably supported by the base plate and extending into said stem, a thermostatic coil with one end connected with the spindle and the other end connected with the stem, an arm fixed to the spindle and extending in front of the index plate, a cover adapted to be fastened to the base plate, an arbor rotatably supported by the cover, means for rotating the arbor, an insulating piece fixed to the arbor, three conductors attached to said insulating piece, and pivotally mounted switching means extending into the path of a part of said arm that is actuated by the thermostatic coil, whereby said switching means may be adjusted to the desired degree of heat and said arm will engage said switching means and cause it to change the circuit from one conductor to another conductor.

ALBERT E. WHITTIER.